Dec. 23, 1958 G. V. BARDET 2,865,109
CONVEYOR FOR DRYING AND COOLING APPARATUS
Filed Aug. 2, 1957 5 Sheets-Sheet 1
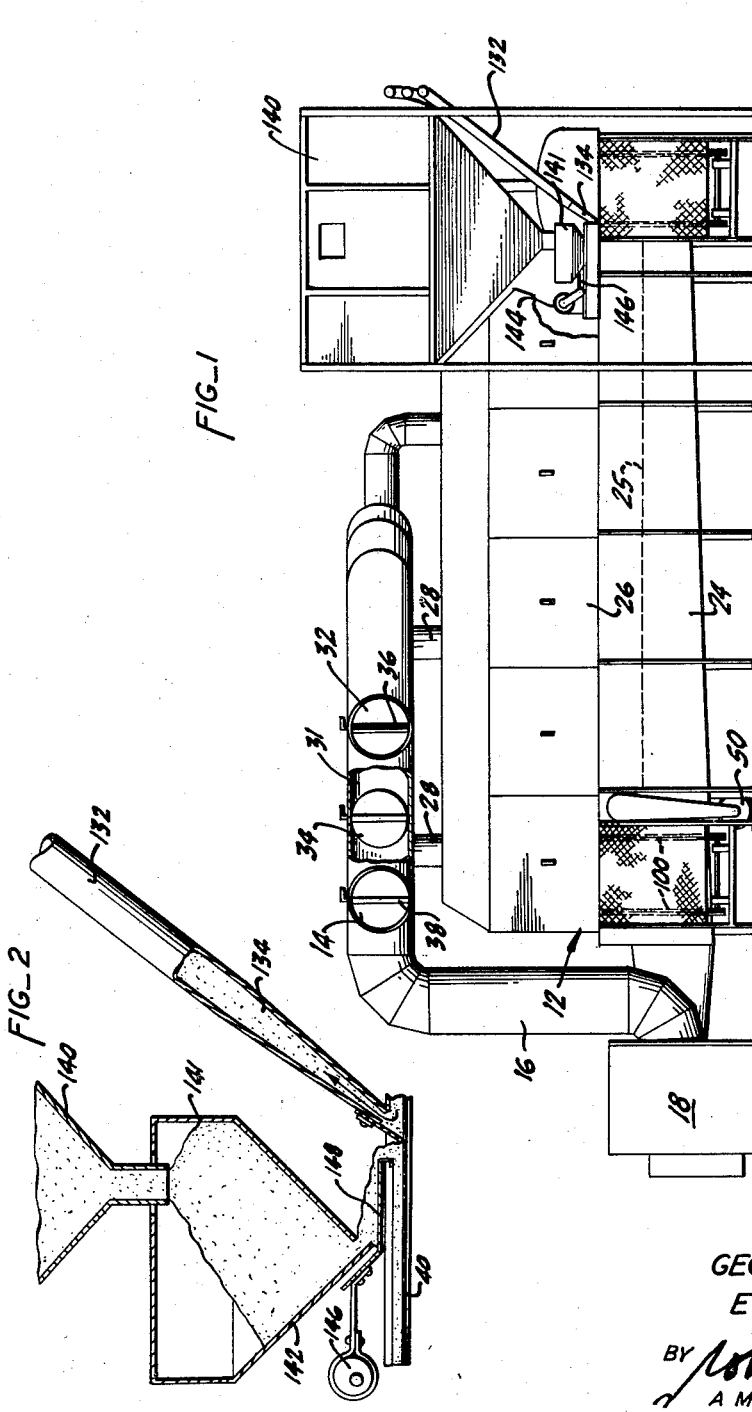
INVENTOR.
GEORGE V. BARDET
ECKHOFF & SLICK
ATTORNEYS
BY
A MEMBER OF THE FIRM Dec. 23, 1958 G. V. BARDET 2,865,109
CONVEYOR FOR DRYING AND COOLING APPARATUS
Filed Aug. 2, 1957 5 Sheets-Sheet 2
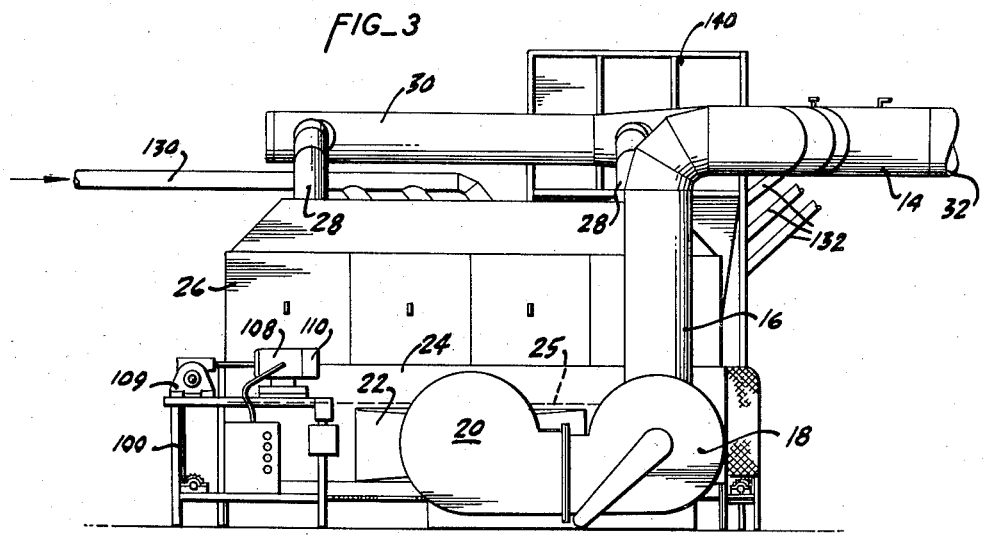
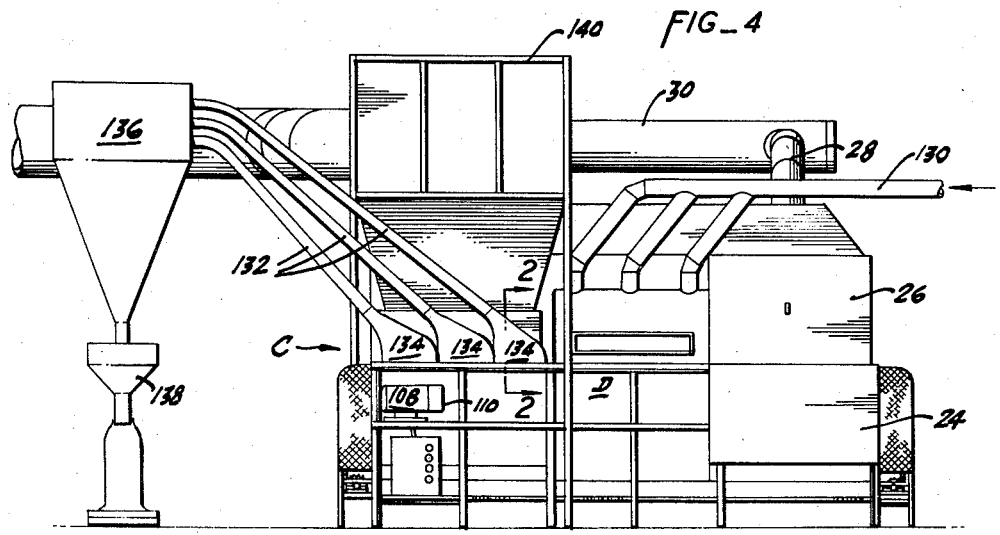
INVENTOR.
GEORGE V. BARDET
ECKHOFF & SLICK
ATTORNEYS
BY
A MEMBER OF THE FIRM Dec. 23, 1958   G. V. BARDET   2,865,109
CONVEYOR FOR DRYING AND COOLING APPARATUS
Filed Aug. 2, 1957   5 Sheets-Sheet 3
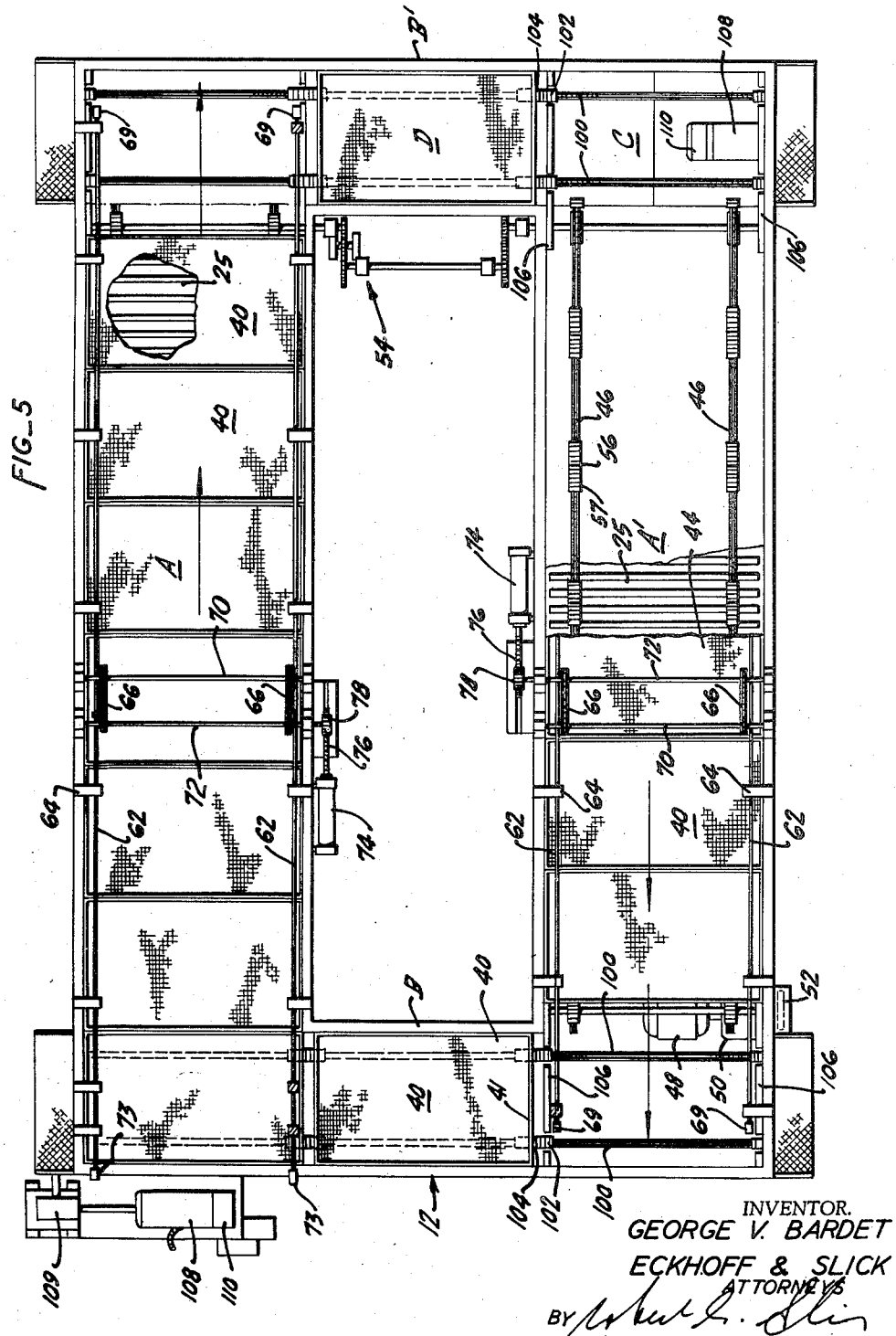

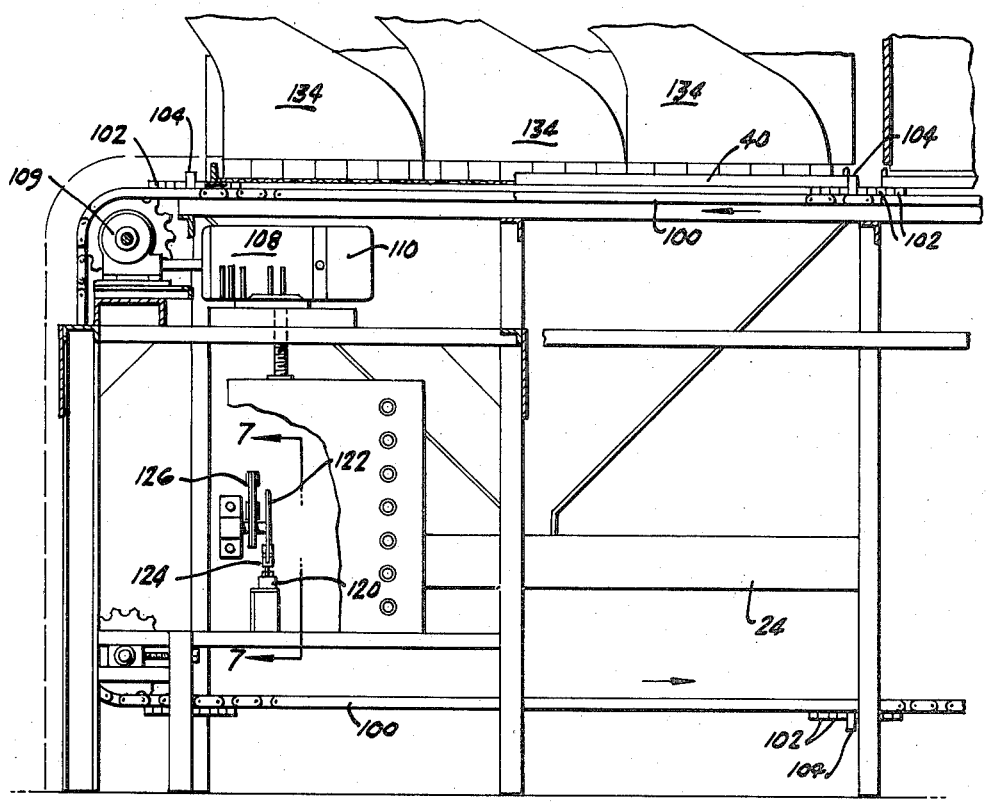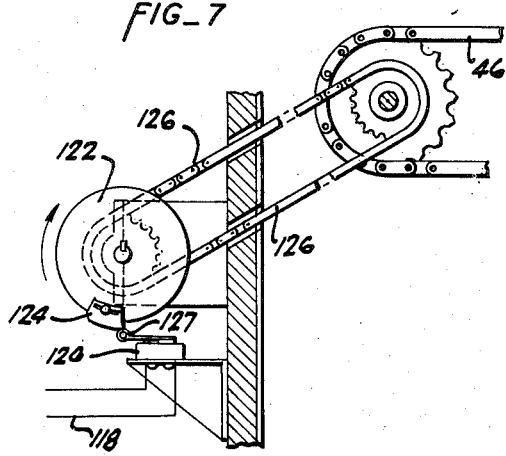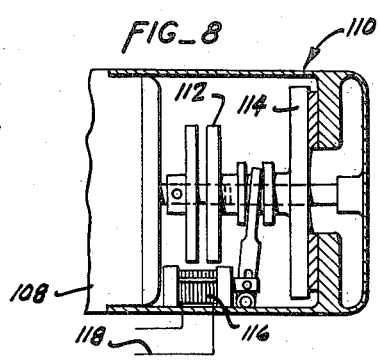

Dec. 23, 1958    G. V. BARDET    2,865,109
CONVEYOR FOR DRYING AND COOLING APPARATUS
Filed Aug. 2, 1957    5 Sheets-Sheet 5
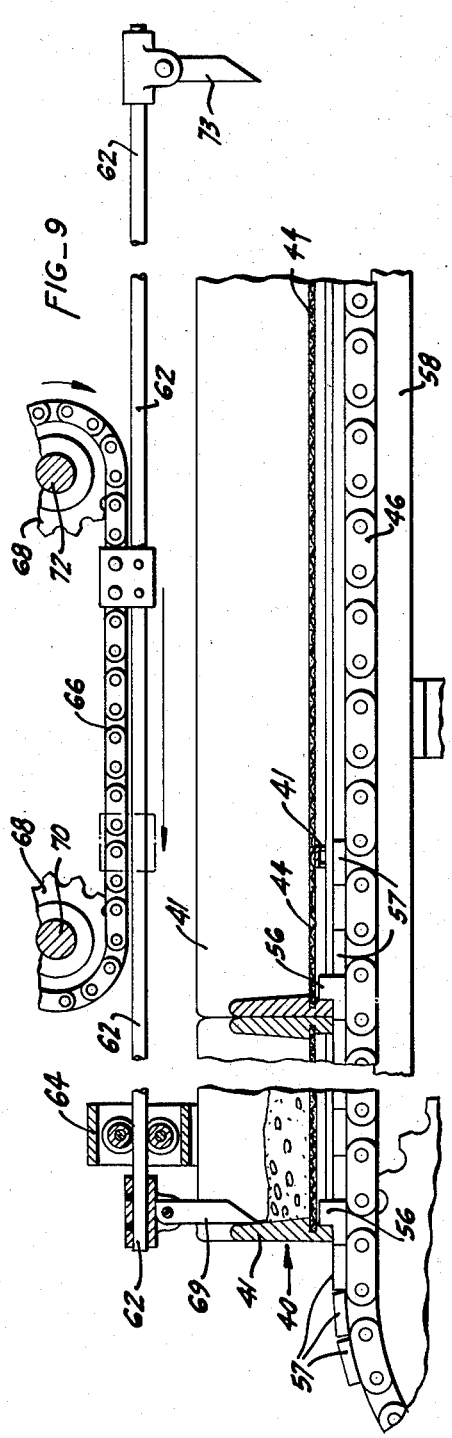
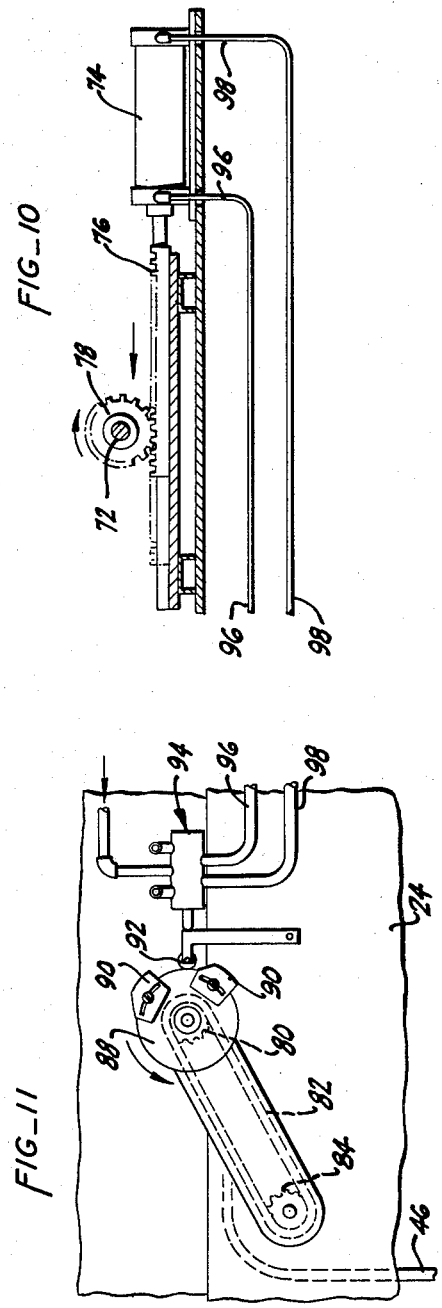
INVENTOR.
GEORGE V. BARDET
ECKHOFF & SLICK
ATTORNEYS
BY
A MEMBER OF THE FIRM

United States Patent Office 2,865,109
Patented Dec. 23, 1958

2,865,109

CONVEYOR FOR DRYING AND COOLING APPARATUS

George V. Bardet, Berkeley, Calif., assignor to M. J. B. Company, a corporation of Delaware Application August 2, 1957, Serial No. 675,933

8 Claims. (Cl. 34—66)

This invention relates to a machine for passing air through solid materials which are in the form of discrete particles and is a continuation-in-part of my application, Serial Number 345,364, filed March 30, 1953, and entitled "Machine" now abandoned.

The machine of the present invention may be used in any situation where one wishes to bring a gas into contact with a finely divided particulate substance, either for heating or cooling, such as in the drying of rice, wheat, beans and the like, roasting coffee or nuts, drying of minerals, or the regeneration of a catalyst.

An object of the present invention is to provide a machine for drying material wherein the material is uniformly treated. By "uniformly treated" it is meant that each particle is subjected to uniform conditions of time, temperature and air flow and that subsequent batches may be treated in exactly the same way.

Another object of this invention is to provide a machine for treating materials which is relatively simple to construct and maintain, and which will operate for long periods of time substantially without supervision.

Another object of this invention is to provide a novel tray handling means whereby flat rectangular trays are passed at a substantially uniform speed, in closely adjacent side-by-side relation, continuously over a level rectangular path.

Still another object is to provide a machine of the character described with both heating and cooling means, so that the product, after heating or other treatment, is cooled rapidly.

In the drawings:

Figure 1 is a side elevation of the drier of the present invention.

Figure 2 is an enlarged detail view taken substantially on the plane of line 2—2 of Figure 4.

Figure 3 is a front elevation of the machine of the present invention.

Figure 4 is a back elevation of the machine of the present invention, showing the end opposite that of Figure 3.

Figure 5 is a plan view of the machine with the top hood removed, showing the placement of the trays in the machine and a portion of the actuating machinery.

Figure 6 is an enlarged detail view of one corner of the machine with portions broken away to more clearly show an end conveyor and its control.

Figure 7 is an enlarged sectional view taken substantially on the plane of line 7—7 of Figure 6.

Figure 8 is a diagrammatic detail of an electrical clutch-brake unit.

Figure 9 is an enlarged fragmentary detail view of an accelerating means forming part of the present invention.

Figure 10 is a detail view on a reduced scale of the drive for the accelerating means of Figure 9.

Figure 11 is a detail view of a control device for the cylinder of Figure 10.

Referring to the drawings now by reference numbers, there is shown a machine having a housing 12 defining a rectangular path having two longitudinal side legs A and A' and two relatively short end legs B and B'. The machine is provided with a duct 14 for the admission of air, which passes through a pipe 16 to a blower 18 which in turn passes the air to a scroll heater 20, where it is delivered by means of the duct 22 to the lower chamber 24 of the machine. The lower chamber 24 of the machine is of a generally tapered cross section and has a slotted baffle 25 therein, as is shown, to deliver air uniformly to trays which are placed over the chamber, as is later described. Chamber 24 is in the form of a U, with one leg longer than the other, in plan, and underlies all of the rectangular sections in Figure 5 except the two in the right-hand corner designated C and D. The heated air passes through the material being treated and into the upper chamber 26 from which it is removed by means of ducts 28 to a manifold 30, which delivers the air to an exhaust duct 32. As is shown in Figure 1, the inlet duct 14 and outlet duct 32 are interconnected with a duct 31 which is provided with a valve or damper 34; the duct 32 is provided with a similar damper 36, and the inlet duct 14 is provided with a similar damper 38. Thus, by appropriate adjustment of the three dampers 34, 36 and 38, one can circulate the same air through the machine, bring fresh air into the machine, or have an intermediate adjustment where a portion of the air is recirculated through the machine and a portion of the air is brought in fresh through duct 14.

A plurality of trays 40 are provided which travel on a level rectangular course along the longitudinal side legs A and A' and the end legs B and B'. The trays 40 are themselves of rectangular configuration and move in side-by-side closely adjacent relation, preferably touching, in their travel along the side legs. This permits a maximum of tray area for a machine of given dimensions and reduces the amount of hot air needed to accomplish a given process. In moving from the side legs A and A' onto the end legs B and B', the trays 40 retain the same orientation, that is, the trays travel sidewise along the side legs and endwise along the end legs. Thus no mechanism is required for rotating the trays.

As will be apparent later, the side legs A and A' must be somewhat longer than is required for the number of trays to travel therealong at any one time, and it is necessary to use two less trays than could be accommodated in the machine were movement of the trays not required. Thus, in the embodiment of the machine illustrated, eighteen trays could be accommodated, if full, but sixteen are used. The trays 40 consist of a rectangular frame 41, suitably of stainless steel, which is covered with a screen bottom 44 of suitable mesh to restrain the articles being treated. The trays are moved along the side legs A and A' of the machine by a constant speed continuous conveyor means, here shown as including endless chains 46. The chain 46 on one side of the machine is driven by a motor 48 through a suitable variable speed gear reduction unit 50 and a drive chain 52. The chain on the opposite side of the machine is driven by means of the power transfer unit designated 54. It will be noted that the power transfer unit 54 includes a reverse gear so that the chains 46 are driven in opposite directions, but at identical speeds, at the opposite sides of the machine. Each chain 46 is provided with lugs 56 and with plate segments 57 secured to adjacent links of the chain in coplanar relation for supporting the trays 40, the chain in turn being supported by a rail member 58 secured to the machine housing 12. The trays 40 rest on the plate segments 57 and are pushed along by the upstanding lugs 56.

As the trays approach a corner, it is necessary that one tray be advanced somewhat beyond the line of trays in order that it can be moved around the corner and will thus be out of the path of the next advancing tray 40.

It is also necessary to advance the last tray in line, so that it will be engaged by a lug 56 on the endless chain 46. However, the dimensions of the machine and positions of the trays is such that both actions cannot take place at the same time. The separate movements of the trays 40 is accomplished by accelerating means having a reciprocating member formed for engaging and moving the foremost of the trays 40 on each of the side legs A and A' faster than their uniform rate of travel along the conveyor 46 so that the foremost tray, when it reaches the end of the side leg, will be spaced from the next tray in line, thus giving the tray 40 time to be moved along the end leg B or B' before the following tray arrives.

The accelerating means should preferably effect smooth starting and stopping of the tray 40 in order to prevent spilling or displacing the layer of particulate material on the tray. This is here accomplished by a pneumatically operated pusher mechanism which includes rods 62 positioned above the lines of trays in side legs A and A' and supported by bearings 64 for endwise reciprocation. Connected to the rods 62 are endless chain loops 66 which entrained around sprockets 68 affixed to transverse shafts 70 and 72 so that rotation of shaft 72 will effect the simultaneous endwise reciprocation of rods 62. The shaft 72 is rotated by a pneumatic cylinder 74 which operates a rack 76 meshed with a pinion gear 78 on shaft 72. The parts are chosen so that the rods 62 are forced ahead at least twice the speed that the chain 46 is moving. The rods 62 carry a swinging finger 69 at their forward ends and a similar finger 73 at their opposite ends. As can be seen from Figure 9, the construction is such that the finger is capable of engaging the rim of a tray and pushing it forward, but will swing out of the way if it encounters a tray when moving in the opposite direction. The finger can also turn sideways, so that it does not interfere with trays moving at right angles to it. Thus, as the rods 62 are driven forward by cylinder 74, the fingers 69 engage and advance the foremost tray to the corner, or the fingers 73 engage and advance the rearmost tray to a position where it is engaged by one of the lugs 56 on conveyor 46. It will be noted that the foremost and rearmost trays are not moved at the same time but are moved on alternate throws of the rods 62. The delay in moving the rearmost tray onto the conveyor 46 permits the next tray ahead to clear the end of the conveyor and the accelerated motion insures that the rearmost tray will not block the corner when the time arrives for the next tray to enter it.

Actuation of the pneumatic cylinder 74 is controlled by means which is timed to operate when the trays 40 reach the proper position for acceleration into and out of the corners. As here shown, a take-off sprocket 80 is driven by a chain 82 entrained on a sprocket 84 secured to one of the supporting shafts of conveyor 46. The number of teeth in the sprocket are such that one revolution of the sprocket 80 takes place for each time a point on the chain 46 moves through the width of one tray. Attached to the shaft of the sprocket 80 is a cam 88. Adjustable segments 90 supply the cam action. A cam follower 92 is provided which actuates the two-way air valve 94, connected by lines 96 and 98 to the cylinder 74. The valve is biased so that air is normally in line 96, keeping the rods 62 in a retracted position. When a segment 90 depresses the cam follower 92, the valve 94 vents line 96 and supplies air to line 98, forcing the rods 62 forward, and accelerating first the foremost and then the rearmost tray in the manner described. It will be noted that the cam 88 carries two segments, or lobes, 90 located around the cam periphery in proper position to actuate the valve 94 when the trays reach the desired position for acceleration.

As a tray arrives at a corner, a second mechanism is used to move the tray at right angles to its former path. This mechanism may be similar to the accelerating means, but preferably consists of a transverse conveyor means positioned in the end legs B and B' and including chains 100 similar to the chains 46 in construction. The trays rest on plate segments 102 and are urged along by lugs 104. It will be noted that the conveyor chains 46 do not enter the corners of the machine, while the chains 100 pass completely across the ends. This permits the chains 100 to move the trays from one corner to the next, the trays sliding into and out of the corners onto and/or from conveyor 46 on tracks 106. The drive for the conveyor 100 consists of a motor 108 which rotates at constant speed and which is operatively connected to the conveyor through gear reducer 109 and a clutch-brake unit 110 in order to allow an intermittent action of the conveyor chains. Such intermittent action is used to halt the conveyor except when the foremost tray 40 arrives at the corner under the influence of rods 68, at which time the conveyor 100 moves it quickly to the position shown in Figure 5 and thus frees the corner for receipt of the next tray. The clutch brake unit 110 is electrically operated to smoothly engage the clutch member 112 and disengage the brake member 114 for smooth starting, and also to disengage the clutch member and engage the brake member 114 to bring the trays on the conveyor to a smooth stop at the desired position. The clutch and brake members are moved into and out of engagement by a solenoid 116 which is energized by an electrical circuit 118 containing a microswitch 120. A cam 122 having an adjustable segment 124 is connected by a chain 126 to the conveyor 46, in a manner similar to the connection of the cam 88 to the conveyor 46. The segment 124, engaging a roller 127, closes the microswitch 120 so as to engage the clutch 112 and disengage the brake 114.

The movement of trays across one side leg and one end leg has been described in detail, and, as is apparent from the drawings, the movement on the opposite legs is substantially the same, and will thus not be described in detail.

When the material has been heated as described, it is often desirable to cool it rapidly to prevent further uncontrolled processing. This is accomplished in the position designated D in Figure 5, where cold air is blown downwardly through the material from pipes 130.

After cooling, the material is removed from the trays at the station designated C. The mechanism for accomplishing this is shown best in Figures 2, 4 and 6, and consists of a series of suction tubes 132 connected to flattened collectors 134 arrayed in a line so as to sweep the tray 40 as it passes into side leg A'. The material may be separated in a conventional cyclone 136 whence it may fall into a hopper 138 for bagging or the like.

The trays are loaded from the hopper 140. The bottom of hopper 140 empties into a feed hopper 141 having a sloping bottom portion 142, and a bottom distributing plate 148 which is vibrated by the motor 144 through an eccentric linkage 146. The plate 148 prevents the free flow of material from the hopper and the action of the eccentric is such that a thin layer of material is deposited evenly on the trays 40 passing thereunder.

It has been found that when material is treated on the machine of the present invention, uniform lots may be produced and all of the material in any given lot is treated in the same manner. In prior art devices, it was found that some material was over-treated and some under-treated when the machine was set for average conditions; the machine of the present invention completely obviates such objections.

I claim:

1. A treating machine of the class described comprising a housing defining a level rectangular path, means controlling temperature and air flow through said housing, means for moving a series of perforated separate trays in closely adjacent relation over the path defined, said trays moving sidewise and at right angles to their former path of travel when reaching a corner of said path, automatic means for speeding up a tray as it approaches a corner so as to permit transverse movement of such tray out of the path of the next succeeding tray, and means for effecting said transverse movement.

2. The treating machine of claim 1 wherein means is provided for blowing hot air upwardly through the trays during a portion of their travel and for blowing cold air downwardly through the trays during another portion of their travel.

3. The treating machine of claim 1 wherein means is provided for loading said trays with an even layer of particulate material and for unloading said trays after passage through said housing.

4. A treating machine of the class described comprising a housing defining a rectangular path having two longitudinal side legs and two relatively short end legs, conveyor means for moving a plurality of separate perforated trays in adjacent relation to each other in opposite directions along said side legs at a uniform rate of travel, accelerating means on each of said side legs adjacent the end of the path of travel of the trays on such side leg, said accelerating means having a reciprocating member formed for engaging and moving the foremost of the trays on each side leg faster than said uniform rate of travel whereby said foremost tray will be spaced from the next tray at the end of each side leg, and conveyor means for moving said foremost tray onto the other of said side legs.

5. A treating machine of the class described comprising a housing defining a rectangular path having two longitudinal side legs and two relatively short end legs, an endless constant speed conveyor in each of said side legs for moving a plurality of separate perforated trays in adjacent side by side relation to each other in opposite directions along said side legs at a uniform rate of travel, accelerating means on each of said side legs adjacent the end of the path of travel of the trays on such side leg, said accelerating means having a reciprocating member formed for engaging and moving the foremost of the trays on each side leg faster than said uniform rate of travel whereby said foremost trays will be spaced from the next tray at the end of each side leg, transverse conveyor means in each of said end legs for engaging and moving said foremost tray onto the other of said side legs, and control means synchronized with said constant speed conveyor to actuate said accelerating means as said foremost tray approaches the end of the side leg to advance such tray into the corner and thereafter to actuate said conveyor means to advance said tray from said corner and along said end leg.

6. The treating machine of claim 5 wherein said endless constant speed conveyor includes spaced parallel chain loops having elements formed to engage and carry said trays along said side legs, and wherein said control means is operated by rotary cams driven from said constant speed conveyor.

7. The treating machine of claim 5 wherein said accelerating means includes a pneumatic cylinder adjacent a side leg connected to said reciprocating member and formed to smoothly accelerate said foremost tray and to bring it to a smooth stop in the corner so as to avoid spilling or displacing particulate material in said trays.

8. The treating machine of claim 5 wherein said transverse conveyor means includes a constant speed motor adjacent an end leg acting through an electrically controlled clutch and brake unit whereby said foremost tray will be moved smoothly and rapidly from one corner to the next without sudden starts and stops.

References Cited in the file of this patent

UNITED STATES PATENTS

| | | |
|---|---|---|
| 1,298,285 | Bogaty | Mar. 25, 1919 |
| 1,508,924 | Collier et al. | Sept. 16, 1924 |
| 1,613,042 | Lykken | Jan. 4, 1927 |
| 2,631,383 | Bettini | Mar. 17, 1953 |

FOREIGN PATENTS

| | | |
|---|---|---|
| 275,650 | Great Britain | May 24, 1928 |